Figure 1:
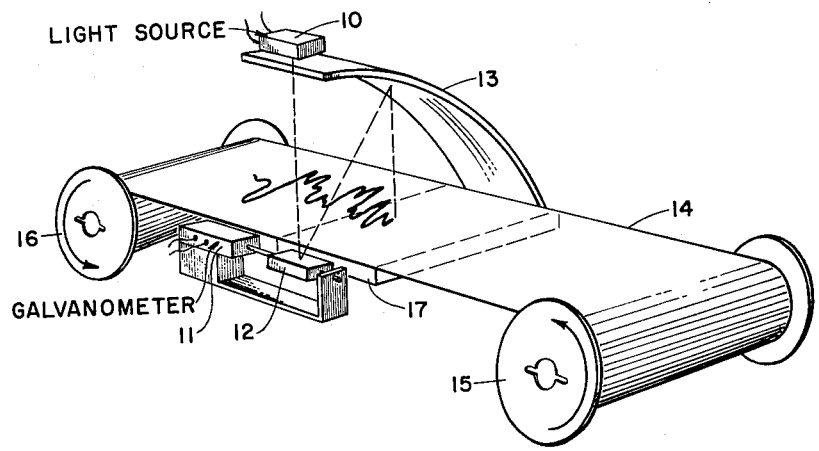

Jan. 2, 1962 S. K. CLARK 3,015,535
OPTICAL SYSTEM FOR MIRROR GALVANOMETERS
Filed June 22, 1960 2 Sheets-Sheet 1

INVENTOR.
STUART K. CLARK
BY
ATTORNEY

Jan. 2, 1962  S. K. CLARK  3,015,535
OPTICAL SYSTEM FOR MIRROR GALVANOMETERS
Filed June 22, 1960  2 Sheets-Sheet 2

INVENTOR.
STUART K. CLARK
BY
ATTORNEY

United States Patent Office 3,015,535
Patented Jan. 2, 1962

3,015,535
OPTICAL SYSTEM FOR MIRROR
GALVANOMETERS
Stuart K. Clark, 5443 Lynbrook Drive, Houston, Tex.
Filed June 22, 1960, Ser. No. 37,955
4 Claims. (Cl. 346—109)

This invention relates to recording meters of the type in which a film or tape is used to make a record of movement of a light beam reflected from the mirror of a galvanometer or similar instrument.

As is well known to those skilled in the art, a source of light is commonly used to project a beam of light upon a mirror attached to the movable element of the galvanometer. The light is reflected from the mirror onto a photosensitive film or tape so that a continuous record can be obtained of electrical values impressed upon the galvanometer. For example, in the electrical logging of oil wells, a photosensitive film is geared to an electrode unit which is lowered into the well. In response to variations of electrical properties of the earth in the vicinity of the electrode unit, the electrical values are indicated by one or more galvanometers and these are recorded on film by the use of optical systems.

In particular, a common telemetric measurement is the determination of the resistivities of the strata and their fluid contents in a bore hole. The determination is conventionally accomplished by passing an electric current between electrodes set at predetermined vertical spacings and measuring the varying resistivities encountered as the electrodes are moved vertically in the bore hole. It is common practice to take several resistivity measurements simultaneously by utilizing pairs of electrodes with different vertical spacings.

The telemetric measurements are brought to the surface through conducting elements and fed into a galvanometer which indicates a variation in current by moving a mirror through a relatively small arc. A beam of light is reflected from the mirror onto a strip of photographic film which moves past the spot of light at a rate proportional to the movement of the electrodes in the bore hole. The lateral movements of the beam of light, produced by the oscillations of the galvanometer mirror, combined with the longitudinal movement of the film, produces a continuous graphic record of resistivity in relation to depth for a given pair of electrodes.

When the lateral movement of the light beam is proportional to the resistivities encountered, a uniform scale may be employed. However, when the resistivities encountered exceed the maximum value provided for on the film chart, difficulties arise. One method to provide for recurring excess values is to start a new segment of curve, using the same chart, but with scale values generally ten times those for the lower or average resistivity curve. This method for recording a corresponding excess in the galvanometric deflection has a number of disadvantages. Namely, only relatively slight oscillations of the galvanometer mirror may be accommodated on the film chart without resorting to a change in the galvanometer sensitivity, thereby causing the composite recording chart to record a plurality of traces, one on top of the other, resulting in an unduly complex graph. It has been discovered that for any selected primary scale value which gives adequate sensitivity for the lower values of resistivity, also requires that a substantial portion of the record which the resistivity values exceed the primary range of the chart scale to be recorded by means of a change in the scale or voltage sensitivity of the galvanometer.

It will be appreciated that when the results from several pairs of electrodes are being recorded simultaneously, the record tends to become complex. It even becomes rather confusing as rapid alternations between high and low resistivities throw the curves from one scale to the secondary range scale at frequent intervals. The resulting complex accumulation of lines on the chart becomes almost undecipherable even by those who are trained.

Accordingly, it is a primary object of the present invention to disclose a method and apparatus for graphically recording resistivities permitting the entire range of values to be recorded as one continuous curve on a single chart.

It is another object of the present invention to disclose a method and apparatus for graphically recording resistivities permitting the entire range of values to be recorded as one continuous curve on a single chart while providing relatively large scale increments for the lowest values and considerably smaller scale increments for the highest values.

It is a further object of the present invention to disclose an apparatus for graphically recording resistivities on photographic film employing an ingenious optical system so that the entire range of values to be recorded may be accomplished as one continuous curve on a single chart.

Figure 2:
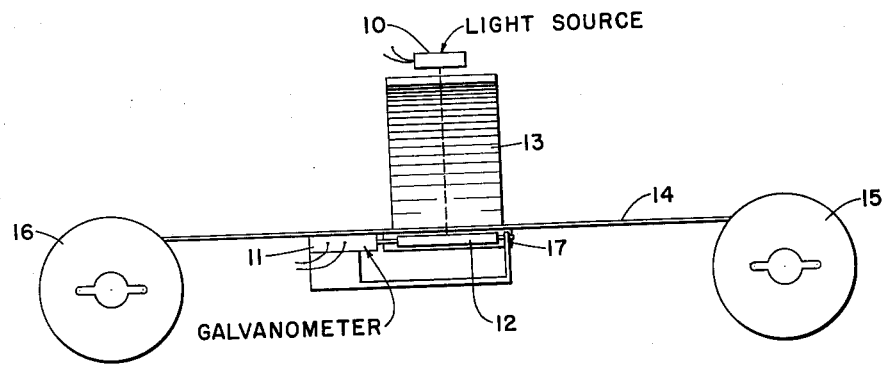
Figure 3:
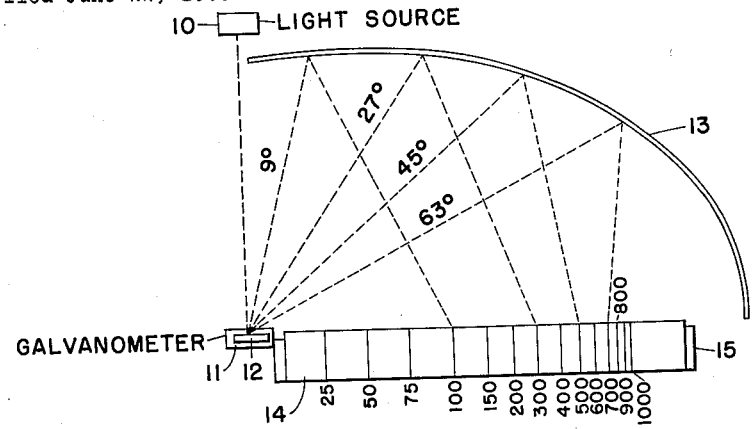
Figure 4:
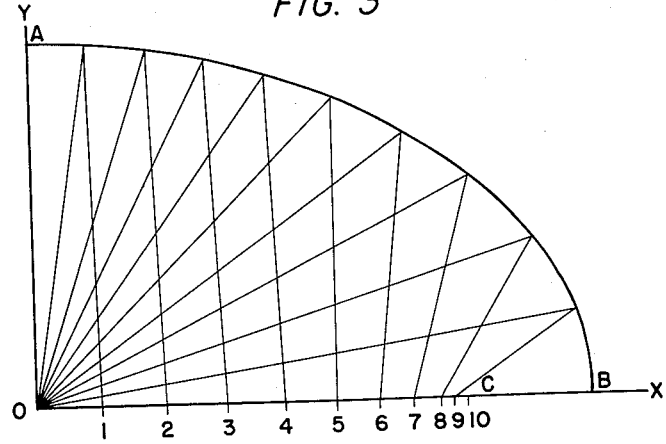
Figure 5:
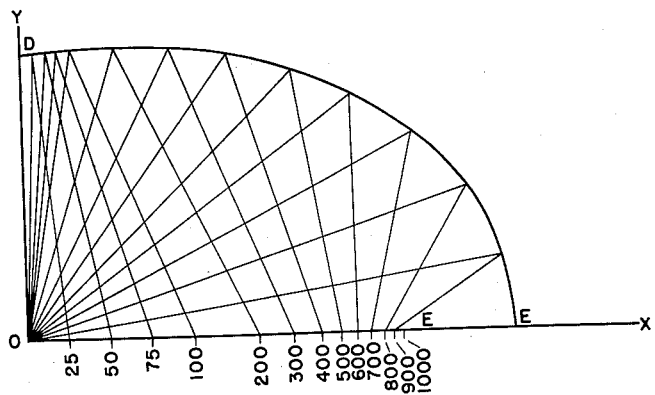

Other objects and many attendant advantages will be readily appreciated as the same becomes better understood by reference to the following detailed description when considered in connection with the accompanying drawings wherein:

FIG. 1 is a perspective view of the system of the present invention.
FIG. 2 is a front view thereof.
FIG. 3 is a side view thereof.
FIG. 4 is a side view of the curved reflecting surface of one embodiment.
FIG. 5 is a side view of the curved reflecting surface of another embodiment.

Now, turning to the drawings for a detailed consideration of the invention, FIG. 1 shows the recording meter set up which includes an optical system in conjunction with a film transport set up and a galvanometer 11 having a mirror 12 mounted on its moving element. It will be appreciated that the showing in the figures is somewhat diagrammatic, but adequately shows the teachings of the invention. The galvanometer may be of the D'Arsonval type which is electrically connected to an electric log sonde positioned in a bore hole. The recording meter should be enclosed in a light-tight housing so that the film does not become exposed in an undesirable manner. It will be observed that the reflective surface of the mirror faces a light source 10 which produces a collimated pencil of light which is directed towards the mirror along the dotted line illustrated.

The mirror 12 reflects the beam of light towards a curved mirror 13 along the dotted line shown. The inner surface of mirror 13 may, for example, be contoured to correspond to a quadrant of an ellipse. More about the detailed structure will be discussed in connection with FIGS. 4 and 5. Sufficient to say that the beam of light is reflected from the surface of mirror 13 onto a film strip 14 or other photosensitive material. Film 14 is unwound from spool 15 and is wound onto spool 16. A suitably positioned film support 17 underlies the film in the area which brings the film in confronting relationship with the curved mirror 13.

An important feature, as has been stated, resides in the ingenious system of providing an optical system which permits the beam of light from light source 10 to be reflected from the galvanometer mirror 12 onto the mirror surface 12 and ultimately onto film strip 14 in a manner which produces wide lateral displacements of the beam of light on the film when the electrical value fed to the galvanometer is within the average range of values. On the other hand, each incremental deflection of the beam of light with respect to the preceding increment, gets smaller as the light beam deflection travels transversely across the film in a direction away from the "zero" signal position. To achieve the effect the system relies upon the curvature characteristics of mirror 13 which having a generally elliptical configuration, reflects the light from its uppermost or less arcuate region in a manner to produce the desirable wide average range deflections. As the mirror 13 reflects the beam of light from the more arcuate regions onto the film strip, the displacements within such a region are not as great and proportionately less great as the reflecting surface is employed having the most arcuate portion. It will be appreciated that the configuration of mirror 13 permits a logarithmic lateral displacement across the width of the film strip.

In order to facilitate the usefulness of the chart produced by the device, the film may be pre-printed with suitable graphic representations corresponding to some desired scale.

FIG. 2 discloses the device of the present invention. The entire device of FIG. 2 is enclosed in a light-tight housing (not shown). Again the component parts of a film support 17 between two film spools may be seen, as well as the optical system.

FIG. 3 is further informative in that it gives an idea as to the ingenious configuration of the mirror 13 employed in carrying out the principles of the invention. The particular configuration is of the type shown in connection with FIG. 5.

FIG. 4 illustrates a design for a reflecting surface AB which produces gradually decreasing scale displacements conforming to the chart scale OC for successive equal angular displacements of a light beam projected along YO from a light source onto a galvanometer mirror 12 located at point O. The beam of light reflected from the galvanometer mirror 12 is in turn reflected from the curved reflecting mirror 13, shown as curved line AB, onto chart scale OC.

On the other hand, FIG. 5 illustrates a configuration of mirror 13 which has a reflecting surface DE which produces equal scale displacements for equal angular displacements during the first 9 degrees, i.e., the first 100 scale units as shown. During the succeeding 81 degrees of angular displacement, shown as 100 scale units to 1000 scale units on the chart OX, there is a gradually decreasing scale displacement. In operation, the beam of light is projected along line YO and is reflected from a galvanometer mirror at point O to the curved mirror 13 and thence onto chart scale OF.

In order to afford a further understanding of the operation, attention is again directed to FIG. 3. In operation, equal angular increments of arcuate movement of the galvanometer mirror represent equal increments of apparent resistivity as encountered in the bore hole. For instance, an angular movement of 4.5 degrees of the galvanometer mirror from its zero position which is normal to the incident beam of light will produce a 9 degree deflection of the reflected beam from the incident beam. From the point at which the reflected beam strikes the curved mirror 13, it will again be reflected onto the recording plane to the scale value of 100 as shown. It is pointed out that within the first 100 units, equal arcuate movements of the galvanometer mirror produce equal displacements of the beam of light at the recording plane.

However, beyond the value of 100, the chart scale is progressively compressed in proportion to a logarithmic scale. As illustrated in FIG. 3, an angular deflection of 13.5 degrees of the mirror will produce a deflection of 27 degrees in the reflected beam, which will in turn be re-reflected from the curved mirror 13 onto the recording plane at a point where the chart has a value of 300.

Further, a deflection of 22.5 degrees of the galvanometer mirror will result in a deflection of 45 degrees in the reflected beam which projects a re-reflected beam of light from the curved mirror 13 onto the recording plane at a point where the chart has a value of 500. Similarly, a mirror deflection of 31.5 degrees will throw a reflected beam onto the chart at the 700 mark.

The foregoing is considered as illustrative only of the principles of the invention. Further, since numerous modification and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. In combination with a mirror galvanometer adapted to rotate about an axis in response to a received electrical signal, and a film adapted to record variations in the rotational position of said mirror, and a light source adapted to cast a beam of light on said mirror and onto said film to record said variations in the position of said mirror; an additional reflecting element comprising a noncircular cylindrical portion having every element of said cylindrical portion parallel to the axis of said galvanometer mirror, means supporting said reflecting element adjacent said film such that the entire light beam from said source when reflected from said mirror galvanometer and said noncircular cylindrical portion and onto said film will lie in substantially the same plane.

2. A device as described in claim 1 wherein the noncircular cylindrical portion generates a portion of an ellipse.

3. A device as described in claim 1 wherein the noncircular cylindrical portion is substantially logarithmic.

4. An optical recorder adapted to record on a moving film comprising; a mirror galvanometer which has its rotational axis parallel to the directional movement of said film; a curved reflecting surface mounted over said film, the center line of said curved reflecting surface being substantially perpendicular to the rotational axis of said mirror galvanometer and adapted to receive reflected light from the mirror of said galvanometer, said reflecting surface being a noncircular cylindrical portion having an element of said cylindrical portion parallel to the rotational axis of said galvanometer mirror; and a light source normal to the surface of said mirror when said mirror is nonenergized whereby light from said source will impinge directly upon said mirror, reflect to said curved reflecting surface, and onto said film when said galvanometer is energized, said direct and reflected light beam lying in substantially the same plane.

References Cited in the file of this patent
UNITED STATES PATENTS

| | | |
|---|---|---|
| 815,831 | Hornauer | Mar. 20, 1906 |
| 1,068,370 | Simpson et al. | July 22, 1913 |
| 1,871,709 | Legg | Aug. 16, 1932 |
| 2,172,166 | Lange | Sept. 5, 1939 |
| 2,429,236 | Potter | Oct. 21, 1947 |
| 2,806,372 | Arps | Sept. 17, 1957 |